Fig. III.
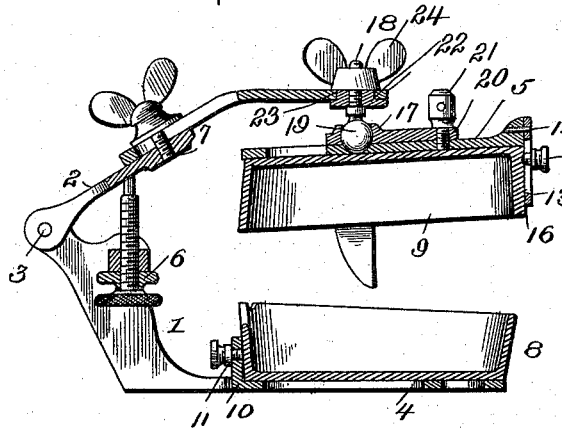
Fig. IV.
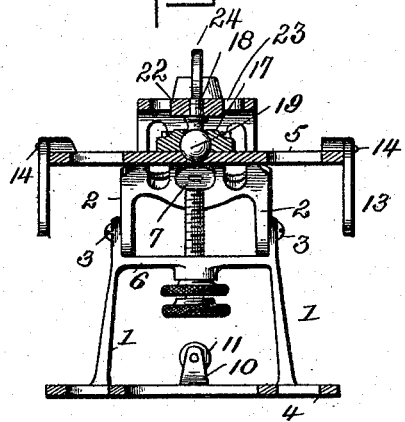
Fig. V.
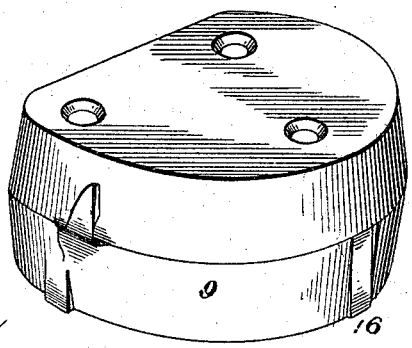

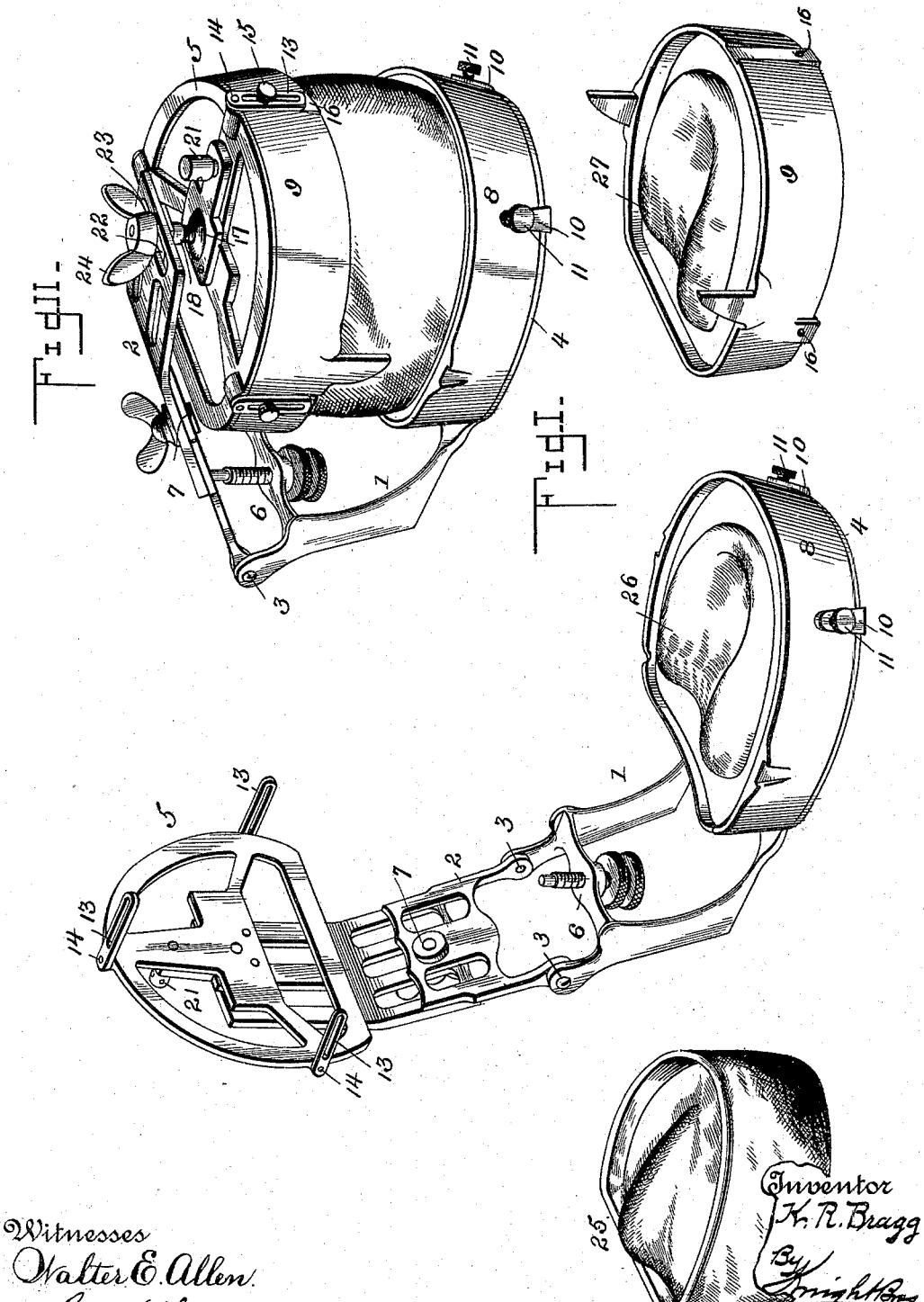

UNITED STATES PATENT OFFICE.

KELLY R. BRAGG, OF SHELBINA, MISSOURI.

ARTICULATOR FOR MAKING ARTIFICIAL DENTURES.

SPECIFICATION forming part of Letters Patent No. 537,812, dated April 23, 1895.

Application filed September 12, 1894. Serial No. 522,810. (No model.)

*To all whom it may concern:*

Be it known that I, KELLY R. BRAGG, a citizen of the United States, residing at Shelbina, in the county of Shelby and State of Missouri, have invented new and useful Improvements in the Manufacture of Artificial Dentures, of which the following is a specification.

My invention has for its object to greatly facilitate, both in point of time and convenience, the manufacture of artificial dentures, by the omission of one of the heretofore necessary steps, and my invention also consists in so combining the articulator and vulcanizing flasks, that not only is the omission of such heretofore necessary step rendered possible, but the process of articulating is greatly facilitated.

Primarily, my invention consists in forming the models in the flasks in the first instance, by filling the flasks with the plastic material to be employed and then applying to such material the respective impression cups, such models remaining in the flasks throughout the process of making the teeth, in order to avoid the necessity of attaching said models to and detaching them from the model-holders of the articulator, and then setting them up in the vulcanizing flasks, and, in order to be able to thus proceed in manipulating the models, and afterward effecting the proper articulation by the insertion of the bite between the models without removing them from the flasks, the latter are adapted to be attached to the respective model-holders of the articulator, and said articulator is adapted to receive the flasks in any relative position in which they may be established by the insertion of the bite between them, and to maintain them in the proper relative positions after the bite is removed.

My invention further consists in certain novel details in the construction of the articulator which better adapted it for use in carrying out the main features of my invention.

In the accompanying drawings, forming part of this specification; Figure I is a perspective view of the articulator constructed in accordance with my invention and having the flasks and the bite associated therewith, with the models formed and the step of articulation ready to be performed. Fig. II is a perspective view showing the parts of Fig. I in assembled position, and the upper jaw of the articulator brought down upon and attached to the upper flask, the attaching parts being accurately set to the angle and distance which said upper flask has assumed by resting down upon the bite. Fig. III is a vertical longitudinal section of the articulator with flasks attached thereto. Fig. IV is a transverse section of the same. Fig. V is a perspective view of one of the vulcanizing flasks after it has been removed from the articulator and the upper member of this particular flask with its removable top plate has been applied.

1 and 2 are respectively the lower and upper jaws of the articulator which are hinged together at 3 and provided with the model-holders 4 and 5, the lower jaw 1 being also provided with the usual spacing screw 6 and the upper jaw being provided with the usual extension joint 7. I prefer to make the hinged joint 3 in the manner shown with screws passing through one arm and entering the other, inasmuch as this gives a tighter joint and avoids all lateral play. It will be observed that it is not necessary with my construction of articulator and method of procedure, to have this joint 3 separable, inasmuch as the molds themselves may be detached at will from the articulator.

8 is the lower and 9 the upper vulcanizing flask which are adapted for attachment to the respective model-holders 4, 5, and the latter are provided respectively with lugs 10 carrying set screws 11 which impinge against seats 12 formed on the lower flask and with slotted arms 13 swiveled at 14 to said upper model-holder and having screws 15 which work in the slots of the arms 13 and are threaded into the upper flask 9 at 16. By these means the respective flasks are readily attached to, or detached from the corresponding holders of the articulator. In order to permit the attachment of the upper model-holder to the flask 9 at any angle which said flask may have assumed when placed upon the bite over the lower flask, said holder 5 is attached to the upper jaw 2 of the articulator by means of a centrally located ball and socket joint 17, consisting of a screw 18 having a ball 19 held in a socket in the model-holder by means of a clamp plate 20 and set screw 21. By these means the upper holder 5 with its attached flask 9 may be adjusted to any angle while the set screw 21 is loosened, and may be securely held at such angle by tightening said set screw. In this connection I also provide for lateral adjustment of the upper holder on its supporting jaw 2, by means of a flanged block 22 which works in a slot 23 in the jaw 2, and in which said screw 18 is held by a thumb nut 24 which also projects over the sides of slot 23 sufficiently to clamp the block 22 at any point to which it may be adjusted.

In making a set of teeth by my invention, plastic material is poured into the respective flasks 8 and 9 in the first instance, and molds or models are formed of the upper and lower jaws of the patient's mouth, by applying to such plastic material in the respective flasks, the impression cups which have been previously made. The bite is then taken in the usual manner and in about the form represented at 25 in Fig. I. The lower flask 8 is then put in place as shown in Fig. I, after which the bite 25 is placed upon the model 26 in said flask 8, with which model said bite will correspond, and then the upper flask 9 with its model 27 is placed in the proper position upon the upper face of the bite 25 with which said model corresponds. It will now be seen that as the bite 25 which has been prepared from the mouth while the latter has been made to assume the natural position, the upper and lower models which have been spaced apart by inserting said bite between them, will be made to assume positions accurately corresponding to the positions of the natural jaws. If now the upper jaw 2 of the articulator is brought down upon the upper flask 9 with the screws loosened so that the holder 5 will rest evenly upon said flask 9, and if then said screws are tightened so as to securely attach the flask to the holder and to prevent any possibility of the holder shifting from the position which has been given it by said flask 9, the set screw 6 being likewise adjusted to maintain the proper spacing of the jaws 1 and 2, it is obvious that said jaws with their attached flasks may be opened and the bite 25 removed after which the teeth may be set up in wax in the usual way, as shown in dotted lines in Fig. I. This being done, the flasks are removed and one or both united with its other half which has been previously supplied with plastic material and an exact model of either or both sets of teeth formed from the wax plate and the teeth embedded therein. After this the wax is melted out, leaving the teeth embedded in the other half of the model, and the rubber or other plate composition placed between the parts of the model and made to assume the proper shape for the mouth and at the same time to adhere to the pens of the teeth by vulcanization or equivalent process. By my process, I save the mixing of the plastic material twice, which results in an important saving of time.

Having thus described my invention, the following is what I claim as new and desire to secure by Letters Patent:

1. The art of making artificial dentures which consists in supplying the models to the vulcanizing flasks, then attaching said flasks to the articulator while the bite is between them, then utilizing the set thus obtained for establishing the proper position of the teeth and finally making the denture from the model in said vulcanizing flask, as explained.

2. The art of making artificial dentures which consists in first placing plastic material into the vulcanizing flasks, then forming a model by the application of an impression cup to said plastic material in each flask, then placing the lower flask in position, then placing the bite upon said lower flask, then placing said upper flask on said bite, and then bringing the upper jaw of the articulator down upon the upper flask, adjusting it thereto and securing thereto so as to secure the proper relation between the flasks, and then completing the articulation of the teeth and the molding of the plate from one or both of the models in said flasks, as explained.

3. In combination with a dental articulator, a vulcanizing flask, and means for attaching said flask to, and detaching it from said articulator, substantially as and for the purpose set forth.

4. In combination with a dental articulator, a vulcanizing flask having connection with said articulator through the medium of a universal joint, substantially in the manner and for the purpose set forth.

5. In a dental articulator the combination of the model-holder and a vulcanizing flask detachably secured thereto as and for the purpose set forth.

6. In a dental articulator the combination of the jaw and a model-holder having a laterally adjustable connection and also an angularly adjustable connection with said jaw substantially as and for the purposes set forth.

KELLY R. BRAGG.

Witnesses:
H. S. KNIGHT,
WM. E. KNIGHT.